United States Patent [19]

Case, Jr. et al.

[11] Patent Number: 4,542,279
[45] Date of Patent: Sep. 17, 1985

[54] MICROVECTOR CONTROL FOR EDGE AND JOINT FOLLOWING

[75] Inventors: Allen W. Case, Jr., Amsterdam; Carl G. Ringwall; Michael L. Pollick, both of Scotia, all of N.Y.

[73] Assignee: General Electric Company, Schenectady, N.Y.

[21] Appl. No.: 472,796

[22] Filed: Mar. 7, 1983

[51] Int. Cl.⁴ .............................................. B23K 9/12
[52] U.S. Cl. .................................. 219/124.34; 901/9; 901/42; 901/47
[58] Field of Search ........... 219/124.34, 125.1, 125.11; 901/9, 42, 47

[56] References Cited

U.S. PATENT DOCUMENTS

| | | | |
|---|---|---|---|
| 3,918,622 | 11/1975 | Larsen | 228/8 |
| 4,021,840 | 5/1977 | Ellsworth et al. | 358/101 |
| 4,328,416 | 5/1982 | Dudley et al. | 250/202 |
| 4,359,624 | 11/1982 | Wascat | 219/124.34 |
| 4,409,650 | 10/1983 | Noguchi | 219/124.34 |
| 4,412,121 | 10/1983 | Kremers et al. | 219/124.34 |

Primary Examiner—Clifford C. Shaw
Attorney, Agent, or Firm—Donald R. Campbell; James C. Davis, Jr.; Paul R. Webb, II

[57] ABSTRACT

An industrial robot is controlled to move by increments and approximately track an edge or a joint. A structured light pattern such as two parallel light bars is projected onto the workpiece and the scene is imaged by a visual sensor. Information derived from the image is used to compute move vectors. The navigation algorithm is based on extracting and computing the next move vector from the visual scene while the current move vector is being executed. The positioning system of an arc welding robot approximately follows the joint to be welded; the computed microvectors specify the direction and distance the positioning system moves.

12 Claims, 9 Drawing Figures

MICROVECTOR CONTROL FOR EDGE AND JOINT FOLLOWING

BACKGROUND OF THE INVENTION

This invention relates to a method of navigating a robotic machine to follow an edge, and more particularly to centering and vectoring a welding robot along the joint between two parts.

Automatic seam welding machines typically assume workpieces and resultant joints whose dimensions and geometries are consistent. This consistency allows the path of a welding torch to be preprogrammed. In applications where this consistency is not valid sensors combined with data processing algorithms are necessary to have the positioning system center itself along the joint.

Visually guided tungsten inert gas (TIG) and metal inert gas (MIG) welding is described in copending application Ser. No. 401,471, filed July 26, 1982, now abandoned, and continuation application Ser. No. 619,432, filed June 11, 1984, now U.S. Pat. No. 4,488,032, A. W. Case, N. R. Kuchar, and D. C. Peroutky. The center of a gas tungsten arc welding torch is cleared and the lens of the integral optical system is over the tungsten electrode; the molten weld puddle and weld region are imaged on the face of a fiber optic cable and transmitted to a video camera and hence to a controller. Concurrently filed application Ser. No. 401,473, now U.S. Pat. No. 4,450,339, N. R. Corby, discloses a molybdenum sleeve on the electrode which blocks light from the intensely bright arc and improves the image. The major goal of visually guided welding is the production of high quality welds automatically, and to this end information is needed from the vicinity of the arc. To produce a quality weld, the positioning system must progress along the joint to be welded such that the puddle remains centered over the joint. In copending application Ser. No. 451,219, filed Dec. 20, 1982, now U.S. Pat. No. 4,496,719 N. R. Corby, the arc welding torch is provided with a programmable laser pattern projector, having a remote light source and beam deflector that traces a particular pattern on the face of a fiber optic bundle and, on the torch, an exit projector and relay assembly. The structured light pattern, for instance thin parallel light stripes, is imaged onto the work within the field of view of the built-in puddle view optical system. At least two light stripes focused on the joint ahead of the weld puddle provide, after processing the image, data on joint topology and navigational information to control movement of the welding torch. These applications are assigned to the assignee of this invention.

SUMMARY OF THE INVENTION

A method of controlling an industrial robot to track one or more edges utilizes information on the location of the edge derived from a visual sensor and structured light pattern such as that just described. A navigation algorithm is presented by which move vectors are computed that cause the robot to move by increments and approximately follow the edge. The basic algorithm is based on extracting and computing the next or a future move vector from the image while the current move vector is being executed. The next vector becomes the new target for the robot's motion device and is computed and ready for execution before execution of the current move vector is complete.

The specific embodiment is the arc welding robot which has a positioning system with X, Y, and Z axes and a C axis rotatable about the last. Each microvector specifies the incremental X, Y, and C axis movements to approximately track a joint (two edges). A first microvector is computed from the known position of the robotic machine. A first image is captured and the first move executed while computing the second microvector from parameters determined from the first image and the positioning system. A second image is captured and the second move is executed while computing a third microvector from parameters extracted from the second image and the positioning system. The navigation algorithms are derived for the case where the welding torch is vertical and the electrode is aligned with the rotation axis. Correction terms are needed for a variable torch angle and when the torch is offset from the rotation axis.

DETAILED DESCRIPTION

Figure 1:
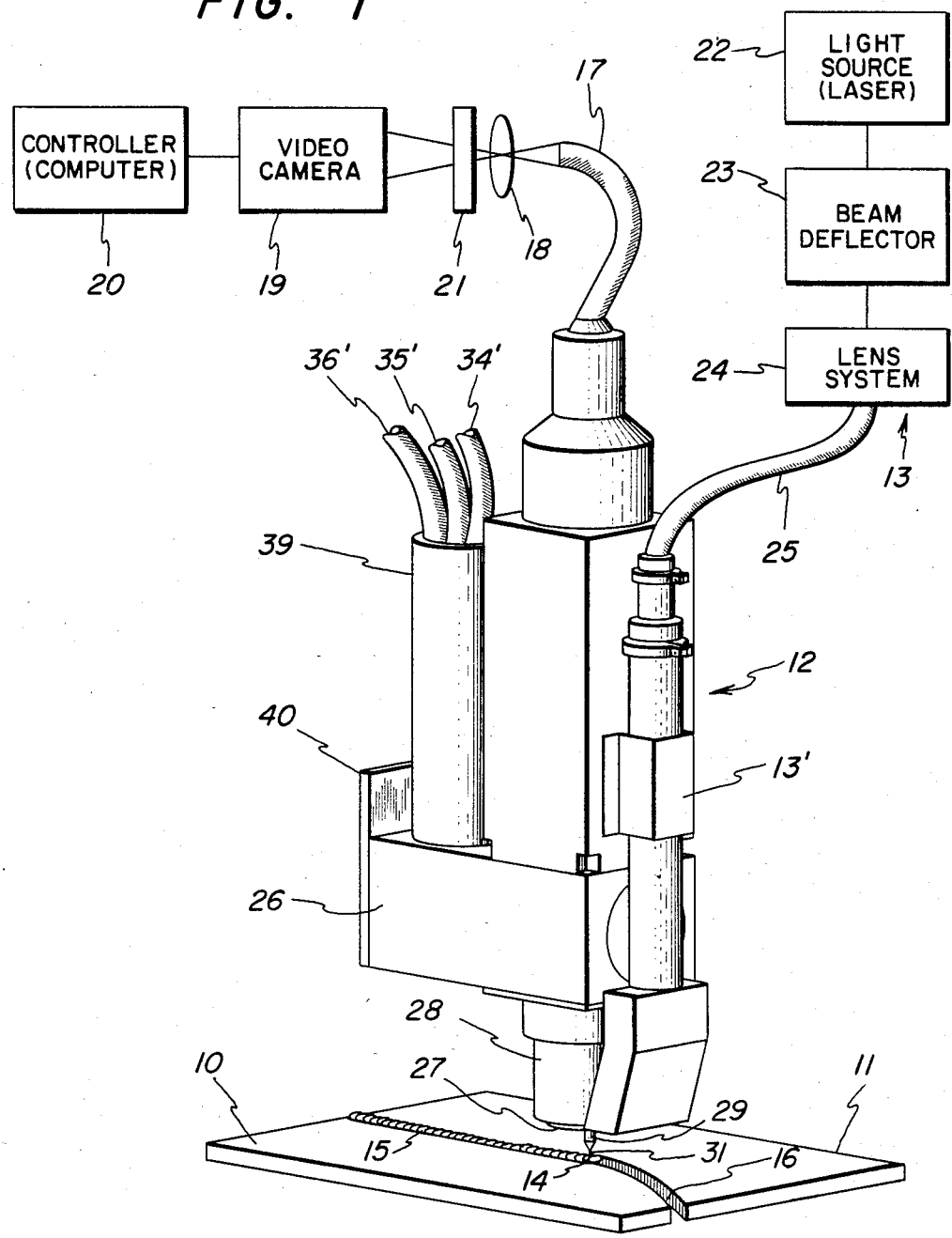
FIG. 1 shows seam welding with a gas tungsten arc welding torch which has a light pattern projector and an integral vision sensor coupled to a remote camera and controller.

In FIG. 1, seam welding of work pieces 10 and 11 is illustrated using a gas tungsten arc welding (GTAW) torch 12 that has a built-in puddle view optical system and to which is attached a projector housing 13' containing the exit optical system of a structured light pattern projection system indicated generally at 13. The weld puddle 14, part of the remelt zone 15, the joint 16 between the workpieces immediately ahead of the weld puddle, and the structured light pattern, typically two parallel lines, are imaged on the face of a coherent fiber optic bundle 17 by which the image is transferred to a remotely located camera and welding controller. The image is magnified by a lens system 18 and relayed to a video camera 19 such as General Electric's TN2500 Charge Injection Device Camera. The video image is fed to a computerized controller 20 and used to navigate the torch to approximately follow the centerline of joint 16, and control the welding process to achieve consistently good quality welds. Optionally, an optical filter 21 is in the camera optical path.

The programmable laser pattern projector 13 may produce a time varying, programmable light pattern or a fixed pattern. A light source 22, generally a laser, forming a narrow beam is optionally passed through a beam intensity modulator and then into a two-dimensional beam deflector 23. The deflector can be a pair of rotating mirrors, each driven by a precision galvanometer mechanism; this system and optionally the modulator are actuated by the output of digital-to-analog converters which in turn are supplied with digital data by a computer or by a source of precomputed X, Y trajectory data. The deflected beam is imaged by an input lens system 24, at a suitable demagnification, onto the entrance of the coherent fiber optic bundle 25. The narrow light beam is deflected spatially to trace out a particular light pattern on the face of the fiber bundle, and after passing along the cable the deflected beam exits the fiber bundle and is imaged by an output lens system onto the target surface. To gain navigational information, two parallel light bars or stripes are desired and the laser beam is programmed to trace a narrow rectangle. Two circles may be used or indeed any pattern having at least two displaced units whose geometry is known.

Figure 2:
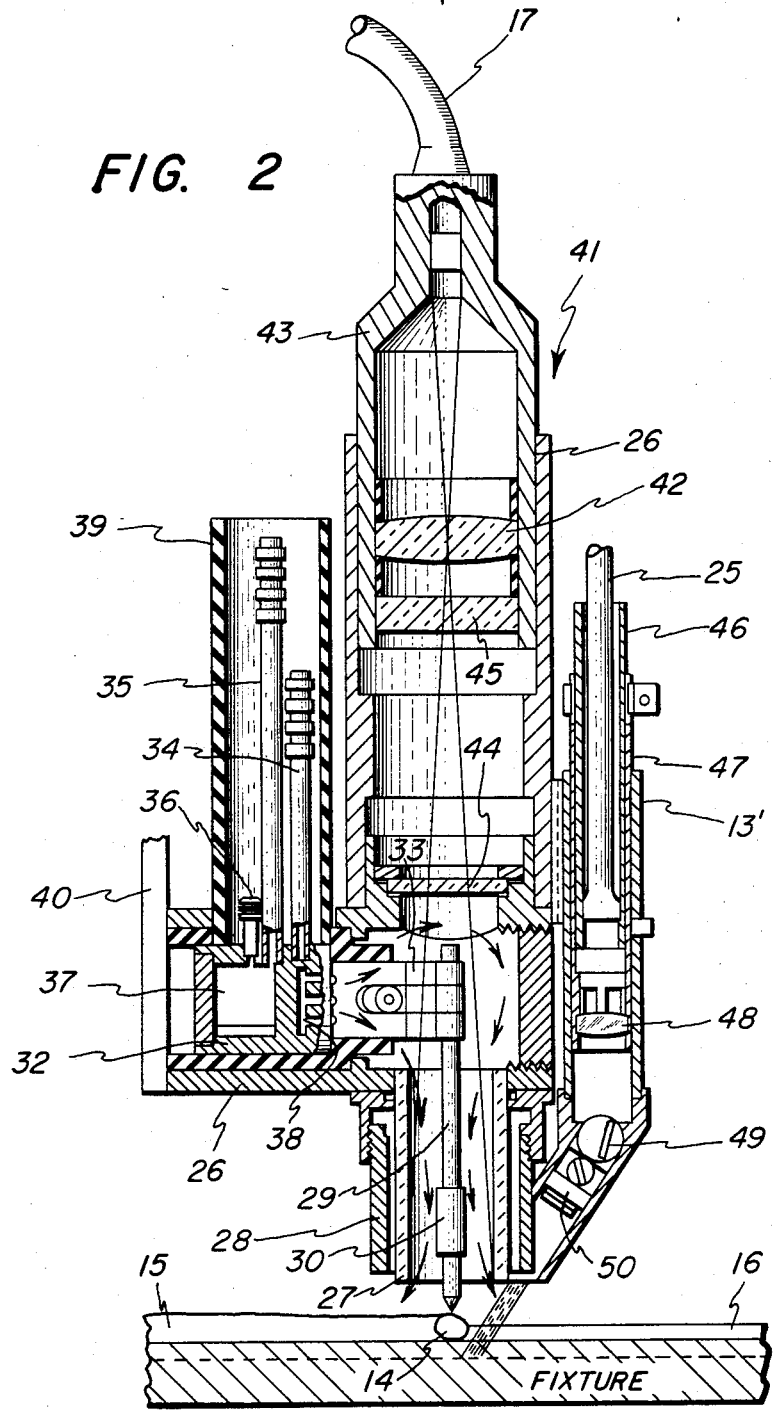
FIG. 2 is a vertical cross section through the robot welding torch and projector attachment.

One configuration of the optical torch is shown in FIG. 2 and is described briefly. At the lower end of metal housing 26 is a ceramic gas cup or nozzle 27 which is surrounded by a metal cup 28. The replacable tungsten electrode 29 is at the center of the gas nozzle and on it is a molybdenum sleeve 30 that serves as an image block and eliminates distortions caused by the presence of portions of the intensely bright electric arc 31 (FIG. 1) established between the electrode and workpiece. The water-cooled copper torch body 32 has an integral slim profile electrode holder 33 and gas, water, and electrical power connections 34–36. The three-part electrode holder 33 provides for a minimum cross section perpendicular to the optical axis consistent with holding the electrode securely and providing adequate conduction area for, say, a 200 ampere electrode current flow. The cylindrical torch body 32 has an interior water chamber 37 and provides optimum cooling of the assembly. Cover gas flows into a separate passage 38 and out through orifices to the interior of the welding torch and hence through gas nozzle 27 to protect the electrode and weld puddle from atmospheric contamination. Slim profile electrode holder 33 is a projecting arm having a ring at its end into which the tungsten rod electrode 29 is inserted; the upper and lower arms of the holder are stationary and integral with torch body 32 and the center arm is movable to clamp the electrode and permit changing of electrodes. An insulating tube 39 encloses the gas, water, and power connections, and cables 34'–36' (FIG. 1) plus fiber optic bundles 17 and 25 are made to exit away from the weld area. A mounting bracket 40 attached to housing 26 permits mounting the optical welding torch 12 to the positioning system of the welding robot.

The torch's integral optical system is indicated at 41. Triplet lens system 42 is mounted inside a lens housing 43 that can be moved axially to focus on the weld spot for a reasonable range of electrode extension beyond gas cup 27. The optical axis is approximately aligned with the center of the gas cup and with tungsten electrode 29. The optical path penetrates a transparent, heat-reflecting quartz window 44 which seals the optics from the cover gas. A filter region accommodates one or more optical filters 45 which are either selective transmission or neutral density filters. Lens housing 43 contains a cylindrical cavity which holds the end face of coherent fiber optic cable 17 on the optical axis; the image picked up at one end of the bundle is transmitted faithfully to the other end. Electrode holder 33 is located sufficiently far from the optical focus region at the weld puddle and surrounding area to provide minimum optical distortion on the face of the fiber optic bundle; the holder is out of focus and is not seen in the image. Blocking device 30 shields the electric arc from being imaged and improves the image generated by the torch-vision system. Projector housing 13' is fastened to one side of the welding torch and angled inwardly and screwed to the gas cups 27 and 28, and contains the exit projector and relay assembly of the programmable laser pattern projection system 13. The end of fiber optic bundle 25 is rotatable and mounted in an inside tube 46 which is slidable, in and out, relative to an intermediate tube 47 at the front end of which is the projection lens 48. Intermediate tube 47 is in turn slidable, in and out, inside of housing 13'. Thus, lens 48 and bundle 25 are mounted on tubes 46 and 47 to permit relative adjustment for focusing. The tilt of a mirror 49, which deflects the exit beam onto the workpiece within the field of view of the puddle view optical system, is adjustable. A quartz window 50 protects the optics from the cover gas.

Figure 3:
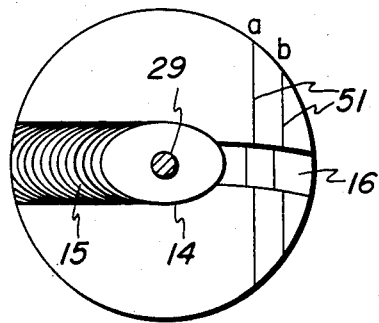
FIG. 3 depicts the field of view of the integral optical system and a light bar pattern projected onto the joint ahead of the weld puddle to gain navigational information.

FIG. 3 shows the field of view of the integral vision sensor 41 and the optical welding torch. The position of tungsten electrode 29 is illustrated, at or near the center of the weld puddle 14 and nominally close to the center of the weld region that is imaged and picked up by the solid state CID camera 19. The structured illumination, two thin, widely spaced, parallel light stripes 51, hereafter referred to as light bars a and b, are focused onto the workpiece and joint 16 close to and just ahead of the weld puddle. Knowledge of the plate topography close to the molten weld pool is gained leading to more accurate navigational information because changes in the joint profile caused by heat, etc., are accounted for. There are discontinuities in the light bars at the joint; this displacement of the light bars is caused by the parallax effect. The CID imager 19 has a 256 by 256 matrix of pixels which are read out line by line or column by column. This discontinuity in the light bar may be sensed and thus the location of the joint edges. As was stated, a single edge can be tracked, or even a line on the workpiece that is a different color than the workpiece itself. It is observed that light bars a and b are approximately perpendicular, to the extent possible, to the joint centerline.

The positioning system 52 of the welding robot is depicted schematically at the top of FIG. 2, and has three linear axes (X, Y and Z) and one rotary axis (C). The specific embodiment of this robotic machine is described in U.S. Pat. No. 4,466,770, D. C. Peroutky, assigned to the same assignee, and a photograph of the same machine is in the magazine Industrial Research & Development, October 1981, page 160. The C-axis is rotatable about the Z-axis, and the welding torch 12 is mounted on the lower end of the C-axis; specifically, bracket 40 is fastened to rotation mounting plate 60, FIG. 6 of the patent. Position feedback is by incremental optical encoders. On the X and Y axis, the encoders are located at the opposite end of the lead screw from the servo motor. On the Z and C axis, the encoders are rigidly coupled to the servo motors.

A navigation algorithm has been developed for centering and vectoring the robot positioning system 52 along the joint 16 formed by the two parts 10 and 11 to be seam welded. This algorithm uses the information derived from the visual scene (FIG. 3) to drive the positioning system forward. The basic algorithm is based on extracting and computing the next move vector from the vision scene while the current move vector is being executed. The next vector becomes the new target for the positioning system and must be computed and ready for execution by the control before execution of the current vector is complete. The microvector control strategy, put more generally, derives from the scene commands to move the robot forward. The direction and distance for the motion device to move in the next command are derived from the scene. The following analysis and microvector calculation assumes that the welding torch 12 is vertical and that the welding electrode 29 is on the rotational axis of the positioning system (the C-axis).

Microvectoring is explained with reference to FIGS. 4a–4c. The length of the move vector is an integer fraction, $1/n$, of the displacement, $S_e$, between the welding electrode 29 and the midpoint between the pair of structured light bars a and b. (In these figures, n=2.) The vector direction is computed from the current position of the robot C-axis. The steps in the move algorithm are as follows.

1. Assume electrode 29 has been manually positioned over the joint at 0 and light bars a and b oriented so they are perpendicular to the joint.

2. The first move is a default vector. Read the robot C-axis angle and compute the microvector to go to move increment 1. The angle is read directly from the C-axis optical encoder on the positioning system. To determine $\Delta X$ and $\Delta Y$ (see aso FIG. 6), the known unit move length is multiplied by sin C and cos C. The move vector is now expressed in the coordinate space of the robot.

3. At time=0, start the first move microvector and capture the scene. The image read out of video camera 19, the CID imager, is transferred to the controller for processing.

4. While executing the first move and going from move increment 0 to 1, compute the microvector for the second move to 2. This computation must be completed and loaded into the control before the positioning system completes the first move, before electrode 29 reaches 1. The calculations of $\Delta X$, $\Delta Y$ and $\Delta C$, using the navigational algorithms given later, are done in a fraction of a second.

5. After the first move is complete, a robot servo early ready signal initiates capture of the next scene from which the third move is computed. The image picked up by the CID imager at that instant is read out to the controller for processing.

6. While the robot is executing the second move and electrode 29 is going from move increment 1 to 2, compute the microvector for the third move to 3, and so on.

7. If the microvector for the next point does not fall within certain prescribed limits, ignore the command and continue to repeat the current microvector until a valid microvector is obtained. This overcomes the tack weld problem.

Figure 5:
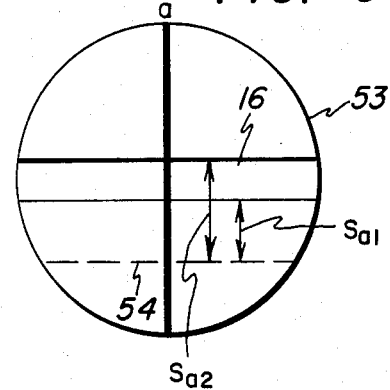
FIG. 5 is an enlargement of the portion of FIG. 4a within the dashed circle.
Figure 4A:
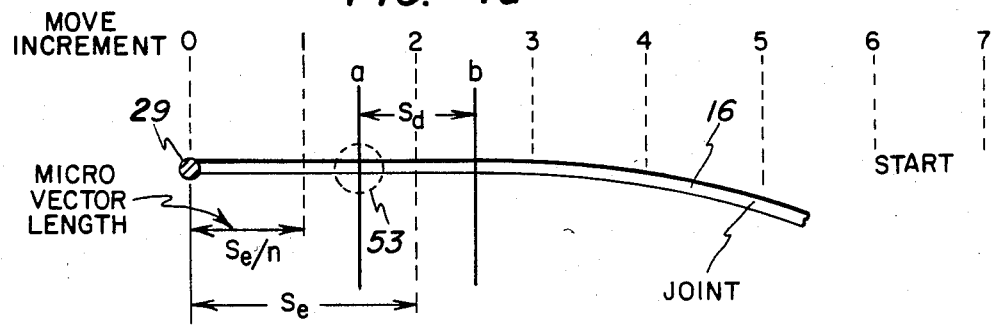
FIGS. 4a–4c are diagrams that explain microvectoring and show the positions of the welding electrode and structured light bars relative to the joint at the start, after the first move, and after the second move.
Figure 4B:
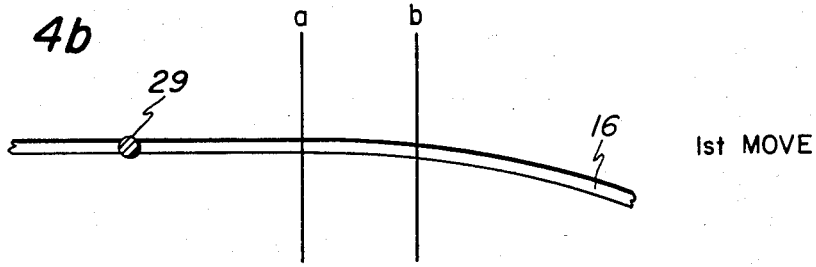
Figure 4C:
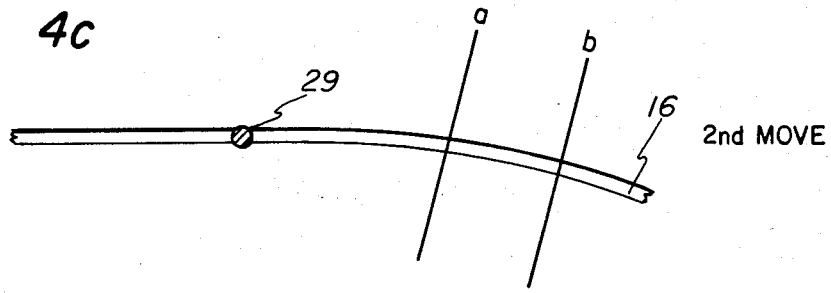

In FIG. 4a, the distance between light bars a and b, $S_d$, is typically 100–150 mils. The distance from electrode 29 (or the robot C-axis of rotation) and the midpoint of the light bars is defined as $S_e$. FIG. 5 is an enlargement of the region within dashed circle 53, the intersection of light bar a with joint 16. Let $S_{a1}$ and $S_{a2}$ be the distance from the two edges of joint 16 to a reference 54, the current position of the robot C-axis. Then, $$\text{Nominal joint center at bar } a = \frac{S_{a1} + S_{a2}}{2} = S_a \quad (1)$$

$$\text{Nominal joint center at bar } b = \frac{S_{b1} + S_{b2}}{2} = S_b \quad (2)$$

From the captured image two parameters from each light bar are extracted, $S_{a1}$ and $S_{a2}$ from the a bar and $S_{b1}$ and $S_{b2}$ from the b bar. In addition, the current C-axis angle of the positioning system is known as well as the X and Y coordinates. Given these parameters extracted from the image and obtained from the positioning system, the quantities $\Delta X$, $\Delta Y$, and $\Delta C$ are to be calculated. Derivation of the algorithms for the first two is developed referring to FIG. 6, which shows the centerline of joint 16 and light bars a and b. The X and Y coordinates are those of the robot positioning system. Angle C is the current C-axis angle of the robot and is measured from the X axis. Reference line 55 designates the current position of the robot's C axis and would be the path followed by the positioning system if the joint were straignt rather than curved. Having the location of four joint edges from the viewed scene, $S_a$ and $S_b$ are calculated and the intersections of light bars a and b with the joint centerline (points 57 and 56) are determined. By adding $S_a$ and $S_b$ and dividing by 2, the approximate location of the point along the joint centerline half way between the light bars (point 58) is calculated. This is the target point for n moves of the robot positioning system; a new target point is established after each move. If n=2, only half the move is made and if n=4, a quarter of the move is made; n is desirably as large as possible but depends on the time required to process the vision sensor information. At the present time the algorithm that has been implemented uses n=4. The result of the microvector control strategy is that the robot only approximately follows the joint centerline, but this is good enough. Resolving the location of target point 58 into X and Y components as shown in dashed lines, the navigation algorithms for $\Delta X$ and $\Delta Y$ are:

$$\Delta X = \frac{S_e}{n} \cos C + \frac{1}{n} \left( \frac{S_a + S_b}{2} \right) \sin C \quad (3)$$

$$\Delta Y = \frac{S_e}{n} \sin C + \frac{1}{n} \left( \frac{S_a + S_b}{2} \right) \cos C \quad (4)$$

Figure 6:
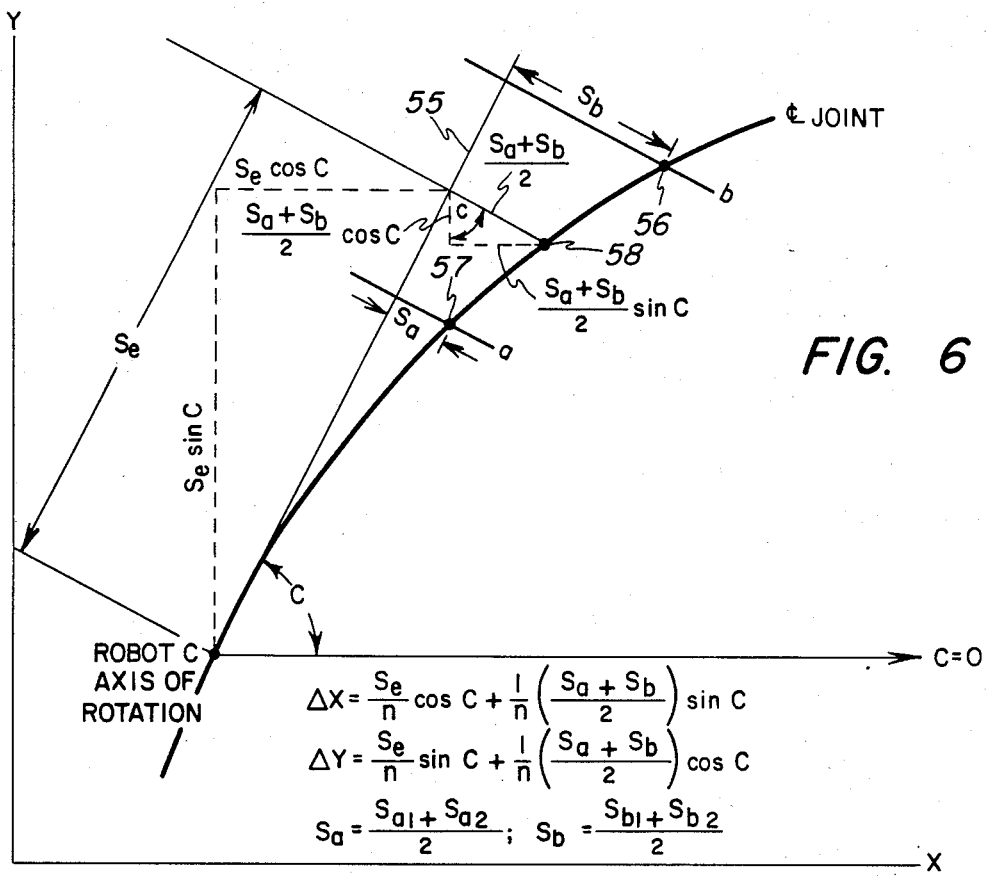
FIG. 6 shows the joint centerline and structured light bars and is used in the derivation of algorithms to control X and Y movements of the positioning system.
Figure 7:
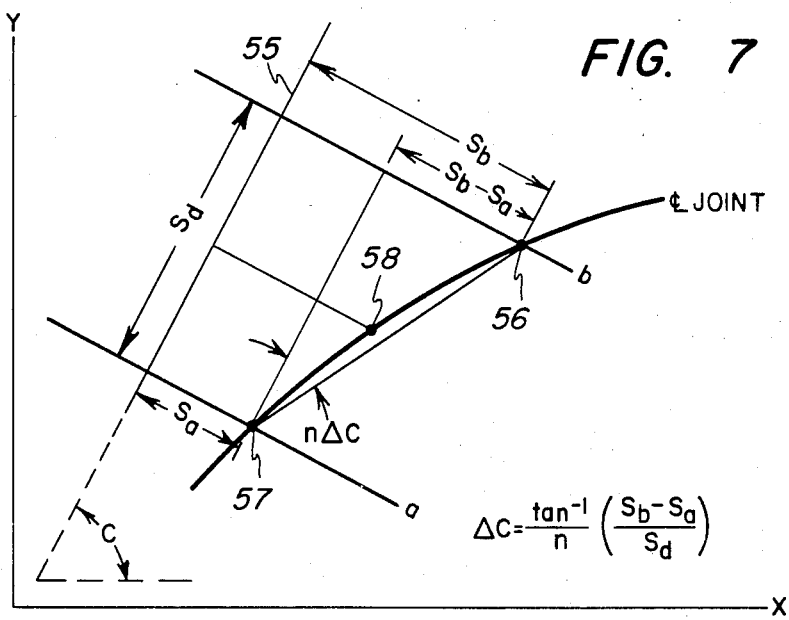
FIG. 7 is an enlargement of a portion of FIG. 6 to explain the algorithm for rotational (C-axis) movement.

The navigation algorithm for $\Delta C$ is understood by looking at FIG. 7 which shows a portion of FIG. 6. A triangle is constructed as shown having one side parallel to reference line 55 and a second side connecting points 56 and 57. The included angle is $n\Delta C$ because only $1/n$ the change in the C-axis is made by the next move. From the geometry in the figure it is seen that:

$$\Delta C = \frac{\tan^{-1}}{n} \left( \frac{S_b - S_a}{S_d} \right) \quad (5)$$

The C-axis correction to follow the joint is only approximate but is good enough.

The microvector algorithms with welding torch offset plus a variable torch angle are now presented. There are additional terms to account for these conditions. In the equations, P is the torch bend angle (90° is vertical), B is the torch offset from the robot swing axis, ΔC' is ΔC expressed in radians, and g is the electrode to workpiece gap.

$$\Delta X = \frac{S_e}{n} \cos C + \frac{1}{n}\left(\frac{S_a + S_b}{2}\right) \sin C \, (\operatorname{cosec} P) + \frac{\Delta C'B}{n} \cos C + g \, (\cotan P) \sin C \quad (6)$$

$$\Delta Y = \frac{S_e}{n} \sin C + \frac{1}{n}\left(\frac{S_a + S_b}{2}\right) \cos C \, (\operatorname{cosec} P) + \frac{\Delta C'B}{n} \sin C + g \, (\cotan P) \cos C \quad (7)$$

$$\Delta C = \frac{\tan^{-1}}{n}\left[\left(\frac{S_a - S_b}{S_d}\right) \operatorname{cosec} P\right] \quad (8)$$

In processing the video image, there is a transformation from the sensor image to the robot reference frame. There may be orientation offsets and physical offsets; these are known and can be calculated.

Given the navigation algorithms, the programmer who has ordinary skill in the art will understand how to program the computer controller to perform real time calculations. From the foregoing it is seen that the microvector control strategy can cause the robot positioning system, set up for another task, to accurately track a single edge on a workpiece. Thus, the method of controlling an industrial robot to follow one or more edges has wide application.

While the invention has been particularly shown and described with reference to a preferred embodiment thereof, it will be understood by those skilled in the art that various changes in form and details maybe made therein without departing from the spirit and scope of the invention.

What is claimed is:

1. A method of controlling an arc welding torch and positioning system to track a joint in a workpiece to be welded, said arc welding torch having a light projector and an integral puddle view optical system, comprising the steps of:

during the welding operation projecting a structured light pattern onto said workpieces and joint close to the weld puddle and producing images thereof with said integral optical system that are transmitted to a video camera and hence to a controller;

computing a first move microvector from known positioning system parameters;

capturing a first image and executing said first move while computing a second move microvector using parameters determined from said first image and from said positioning system;

capturing a second image and executing said second move while computing a third move microvector using parameters determined from said second image and from said positioning system;

said moves causing said positioning system to approximately follow said joint.

2. The method of claim 1 wherein said positioning system has X, Y, and Z axes and a C axis rotatable about the last, and each microvector is calculated from navigation algorithms that give the incremental X and Y movement and change in C-axis angle to approximately follow said joint.

3. The method of claim 2 wherein said structured light pattern is two thin, widely spaced parallel light bars, and the parameters extracted from each captured image are the distance along the light bars from the current position of the rotational C axis to both edges of said joint.

4. The method of claim 2 wherein said navigation algorithms have additional terms to account for a variable torch angle and offset of said torch from the rotational axis.

5. A method of controlling an industrial robot to move by increments to track at least one edge on a workpiece comprising the steps of:

projecting a structured light pattern onto the workpiece intersecting and approximately perpendicular to said edge;

producing images of the foregoing scene with an optical lens system that are relayed to a controller;

computing a first move microvector from robot parameters;

capturing a first image and executing said first move while computing a second move microvector from parameters derived from said first image and robot; and capturing a second image and executing said second move while computing a third move microvector from parameters derived from said second image and robot;

said moves causing said robot to approximately follow said edge.

6. The method of claim 5 wherein said robot has a positioning system having a rotational axis and each microvector computed from parameters derived from said images gives the angle and distance for said robot positioning system to move.

7. The method of claim 6 wherein said positioning system has X, Y and Z axes and said rotational axis is a C axis rotatable about the last, and each microvector specifies the incremental X, Y and C axis movements to follow said edge.

8. The method of claim 6 wherein said structured light pattern is only two thin, widely spaced parallel light bars which are kept approximately perpendicular to said edge.

9. The method of claim 8 wherein the parameters derived from said images include the distance along each light bar from a reference to said edge, and said reference is the current C axis angle.

10. A method of controlling the positioning system of a welding robot, which has a rotational axis and a vision sensor, to track a joint in a workpiece, comprising the steps of:

during the welding operation projecting a structured light pattern onto said workpiece approximately perpendicular to said joint and close to the weld puddle;

viewing the foregoing scene with said vision sensor and sequentially capturing a plurality of images of said weld puddle, joint and structured light pattern that are transferred to a controller; and executing move vectors specifying the direction and distance for said positioning system to move by increments to approximately follow said joint;

each move vector being computed from parameters extracted from one image and obtained from said positioning system; the next move vector being extracted and computed while the current move vector is executed.

11. The method of claim 10 wherein said structured light pattern has only two spatially displaced pattern units whose geometry is known.

12. The method of claim 11 wherein said parameters extracted from said images are the distances from a reference to the intersection of each pattern unit with the edges of said joint, and said reference is the current position of said rotational axis.

* * * * *